US009807841B2

(12) United States Patent
Liscinsky

(10) Patent No.: US 9,807,841 B2
(45) Date of Patent: Oct. 31, 2017

(54) CIRCUIT FOR EXPANDING THE DIMMING RANGE OF AN LED LAMP

(75) Inventor: Stephen M. Liscinsky, Stratford, CT (US)

(73) Assignee: Hubbell Incorporated, Shelton, CT (US)

( * ) Notice: Subject to any disclaimer, the term of this patent is extended or adjusted under 35 U.S.C. 154(b) by 1189 days.

(21) Appl. No.: 13/547,877

(22) Filed: Jul. 12, 2012

(65) Prior Publication Data

US 2014/0015420 A1 Jan. 16, 2014

(51) Int. Cl.
*H05B 37/02* (2006.01)
*H05B 33/08* (2006.01)

(52) U.S. Cl.
CPC ..... *H05B 33/0854* (2013.01); *H05B 37/0218* (2013.01); *Y02B 20/46* (2013.01)

(58) Field of Classification Search
CPC  H05B 33/0854; H05B 37/02; H05B 37/0218; Y02B 20/44; Y02B 20/46
USPC ............ 315/149–159, 185 R, 291, 307–308
See application file for complete search history.

(56) References Cited

U.S. PATENT DOCUMENTS

| | | |
|---|---|---|
| 3,265,930 A | 8/1966 | Powell, Jr. |
| 3,611,024 A | 10/1971 | Nakatsu et al. |
| 4,319,164 A | 3/1982 | Tulleners |
| 4,456,855 A | 6/1984 | Sairanen |
| 4,651,060 A | 3/1987 | Clark |
| 4,777,427 A | 10/1988 | Kiyohara |
| 5,003,230 A | 3/1991 | Wong et al. |
| 5,039,914 A | 8/1991 | Szuba |
| 6,204,770 B1 | 3/2001 | Johnson |
| 6,329,767 B1 | 12/2001 | Sievers |
| 6,339,298 B1 | 1/2002 | Chen |
| 6,636,027 B1 | 10/2003 | Nerone |
| 6,805,469 B1 | 10/2004 | Barton |
| 6,815,908 B2 | 11/2004 | Glaser et al. |
| 7,102,902 B1 | 9/2006 | Brown et al. |
| 7,118,235 B2 | 10/2006 | Barton |
| 7,119,497 B2 | 10/2006 | Gonthier et al. |
| 7,247,991 B2 | 7/2007 | Chen et al. |
| 7,321,203 B2 | 1/2008 | Marosek |
| 7,330,107 B2 | 2/2008 | Ito et al. |
| 7,481,570 B2 | 1/2009 | Souza et al. |
| 7,557,520 B2 | 7/2009 | Chen et al. |
| 7,592,755 B2 | 9/2009 | Chen et al. |
| 7,609,008 B1 | 10/2009 | Kohler |
| 7,723,926 B2 | 5/2010 | Mednik et al. |
| 7,724,557 B2 | 5/2010 | Ganta Papa Rao Bla et al. |
| 7,758,234 B1 | 7/2010 | Savicki, Jr. et al. |
| 7,843,146 B2 | 11/2010 | Chang Chien et al. |
| 7,843,147 B2 | 11/2010 | Chenetz |
| 7,855,520 B2 | 12/2010 | Leng |
| 7,936,576 B2 | 5/2011 | Ham |
| 8,098,021 B2 | 1/2012 | Wang et al. |
| 8,115,536 B2 | 2/2012 | Snelten |

(Continued)

*Primary Examiner* — Jimmy Vu
*Assistant Examiner* — Henry Luong
(74) *Attorney, Agent, or Firm* — Michael Best & Friedrich, LLP

(57) ABSTRACT

A circuit and method for controlling one or more light emitting diodes (LEDs) includes one or more LEDs connected to the emitter a transistor and controlling the brightness of the LEDs over a large range based on a voltage range at a base of the transistor controlled by an automatic adjusting mechanism.

17 Claims, 4 Drawing Sheets

(56) References Cited

U.S. PATENT DOCUMENTS

| | | |
|---|---|---|
| 8,120,280 B2 | 2/2012 | Yi et al. |
| 8,148,911 B2 | 4/2012 | Chen et al. |
| 2005/0082989 A1* | 4/2005 | Jones ................... F21L 4/00 315/194 |
| 2006/0262462 A1 | 11/2006 | Barton |
| 2009/0033247 A1* | 2/2009 | Ganta Papa Rao Bla ................ H01R 25/00 315/308 |
| 2010/0295460 A1* | 11/2010 | Lin .................. H05B 33/0812 315/193 |
| 2010/0308739 A1 | 12/2010 | Shteynberg et al. |
| 2011/0227493 A1 | 9/2011 | Du et al. |
| 2011/0273102 A1* | 11/2011 | van de Ven ....... H05B 33/0809 315/193 |

\* cited by examiner

CIRCUIT FOR EXPANDING THE DIMMING RANGE OF AN LED LAMP

BACKGROUND OF THE INVENTION

Field of the Invention

The present application relates generally to a circuit for controlling the brightness of a light emitting diode (LED) and more specifically to a circuit for extending the range over which the LED can be illuminated.

Description of Related Art

With the rising cost of energy, the search continues for lighting solutions that consume less power and operate at a lower overall cost. For a time, compact fluorescent light bulbs, or CFLs as they are commonly known, were believed to be a viable energy efficient solution. One problem with CFLs, however, is that they contain a small amount of mercury (Hg), a potentially dangerous substance, making disposal of the spent CFL bulbs difficult because they cannot simply be thrown in the garbage. Additionally, the mercury from broken CFLs can present a health hazard if not promptly and properly cleaned-up. In response, the Environmental Protection Agency (EPA) has issued guidelines for cleaning up and disposing of CFLs. Because of these issues, an energy efficient alternative to CFLs has been pursued.

Light emitting diodes (LEDs) are small light sources that become illuminated by the movement of electrons through a semiconductor material. Most LEDs belong to one of two categories, low power or high power. LEDs are also increasing in popularity and can be integrated into all sorts of products to provide white and colored light, such as indicator lights, flashlights, light bulbs, and integrated light fixtures. Significant advances have been made in LED technology to produce higher power at lower initial cost to the consumer. Also, LEDs last longer, are more efficient, and produce less heat than traditional incandescent light bulbs. LEDs also contain no mercury.

Circuits for controlling the ON/OFF nature and, to a degree, the brightness of LEDs are known. Conventional circuits for controlling the luminescence, or brightness, of an LED in devices such as lighted GFCIs, electrical receptacles with a nightlight feature, stand-alone nightlights and lighted switches, just to name a few, however, provide limited dimming range. For example, such conventional devices include placing the LED(s) in the collector circuit of a bipolar junction transistor (BJT) and attempting to control the brightness of the LED by controlling the voltage, or current, at the base of the transistor.

Referring to FIG. 3, a conventional circuit 300 for controlling an LED 310 is shown. Specifically, BJT 320 has a base terminal (B), a collector terminal (C) and an emitter terminal (E). Collector terminal (C) of the BJT is connected to the line, or positive, side of a power source at terminal 350 through LED 310, resistor 330 and diode 340. Emitter terminal (E) of the transistor is connected to the neutral, or negative, side of the power source at terminal 360, and base terminal (B) of the transistor is tied to a voltage divider circuit comprising resistor 370 and photo resistor 380.

When the base (B) of transistor 320 is biased with a voltage greater than the base-emitter junction voltage ($V_{BE}$), current flows through the collector circuit, that is, through resistor 330 and LED 310, to the emitter (E) and ultimately to ground. If the current flowing through the collector circuit exceeds the value necessary to turn ON the LED, LED 310 will illuminate. Because the LED is in the collector circuit and a typical value for the base-emitter voltage, $V_{BE}$, of a BJT is only 0.6 volts, however, the dimming range of LED 310 in the arrangement shown in FIG. 3 or, in other words, the range by which the brightness of the LED can be controlled, is very narrow. In particular, in accordance with this arrangement, when the base voltage of the transistor is less than 0.6 volts, as compared to the voltage at the emitter (E), which is zero because it is tied to ground, the LED will remain OFF and when the base voltage is equal to or greater than 0.6 volts, the LED is ON. Thus, the brightness of LED 310 is controlled to be either dark or bright, with very little, or no, range in-between.

Thus, according to conventional circuits for controlling an LED lamp such as the circuit shown in FIG. 3, a wide range of brightness is unachievable and such circuits would not be ideal for use in certain devices. For example, certain devices may be used to provide light for people to see in a room where the amount of ambient light varies over the course of the day. Circuits such as the one in FIG. 3 would not be ideal because the LED would either be OFF, when a certain amount of ambient light is present, or ON, when the ambient light drops below that threshold. Accordingly, at times light, or a certain brightness of light, is provided when it is not necessarily needed or desired, and at other times light, or an increased brightness of light, is desired but not provided.

To overcome the problems described above in connection with the conventional circuit shown in FIG. 3, it is has been known to add components to the collector circuit to regulate, or vary, the current flowing in the collector and, thus, in the LED. This technique adds more range of brightness for the LED as determined by the additional circuitry. For example, referring to FIG. 4A a schematic is shown in accordance with this revised conventional approach. Specifically, the schematic shown in FIG. 4A includes a circuit 400 to drive LEDs 410 which are used, for example, to light the area in the vicinity of a conventional electrical receptacle or GFCI device 480 through lens 490, as shown in FIG. 4B. When the ambient light is above a certain level, light sensor 420 reacts to the ambient light level and diode 425 begins to conduct. Sensor 420 is implemented by a light sensing diode and the amount of current conducted by sensor 420 is related to the amount of incident ambient light sensed by the sensor.

As the ambient light increases beyond a predetermined level, a level adjustable by potentiometer 430, the Darlington transistor pair (Q1, Q2) is turned OFF. Specifically, the current flowing through diode 425 pulls down the base of transistor Q1 and transistor Q1, in turn, pulls down the base of transistor Q2. When the ambient light begins to decrease, e.g., as night begins to fall, the current flowing through sensor 420 begins to decrease, accordingly. At some predetermined ambient light level, the current flowing through sensor 420 diminishes to the point where current begins to flow through diode 425 and resistor 427. As a result, transistors Q1 and Q2 are turned ON and collector/emitter current in Q2 flows, thus, energizing LEDs 410.

In the schematic shown in FIG. 4A, a dimmer potentiometer 415 is provided to allow the user to adjust the brightness of the LEDs 410. Sensor 420 and variable resistor 430 function as a voltage divider. Therefore, the voltage presented to diode 425 changes in accordance with the variable resistance of sensor 420.

Although this approach provides additional range in the brightness of the illuminated LED, it also adds complexity and cost to the circuitry and may not be desirable in many applications.

Accordingly, it is desirable to provide a circuit for controlling the brightness of one or more LED lamps over a relatively wide range where the circuit is simple and inexpensive and can be used in a variety of electrical devices.

SUMMARY OF THE INVENTION

Exemplary embodiments of the present invention address at least the above problems and/or disadvantages and provide at least the advantages described below.

According to embodiments of the present invention, LED(s) are placed in the emitter circuit of the transistor, as opposed to placing them in the collector circuit like in the conventional circuits described above. Configuring the circuit in this manner takes advantage of the additional voltage range afforded for controlling the brightness of the LED(s). More particularly, by placing the LED(s) in the emitter circuit and varying the base voltage over a range of voltages, for example, by using a photocell resistor in the base circuit, the brightness of the LED(s) can be controlled over a larger range corresponding to the range of voltages at the base of the transistor.

For example, if two high intensity LEDs, each having a forward bias voltage of 1.2 volts, are placed in series between the emitter of the transistor and ground, and a voltage divider including a photocell resistor is placed in the base circuit of the transistor, the effective sensitivity of the voltage divider circuit is increased to approximately 3.0 volts, i.e., approximately 0.6 volts for the $V_{BE}$ of the transistor plus 2.4 volts for the two LEDs. Accordingly, the LEDs can be dimmed over a wider range, i.e., from full brightness to OFF and the continuous range in-between.

Accordingly, an aspect of exemplary embodiments of the present invention is to provide a circuit for dimming the LED over a wider range using a photocell to generate a varying bias voltage on a transistor. Such a dimmable LED can be used, for example, in a wall switch, a regular or GFCI receptacle, a nightlight or some other illumination device. LED type lights are becoming increasingly popular due to the high energy efficiency and brightness of LEDs. Additionally, previously used neon lamps are becoming increasingly unavailable, leading to even more demand for LED lamps.

According to one exemplary embodiment of the invention a circuit for controlling the brightness of one or more light emitting diode (LED) is provided. A circuit according to this embodiment provides a wide range of dimming and comprises a transistor having a base, an emitter and a collector. A voltage source generates a voltage at the base of the transistor and an LED is disposed between the emitter of the transistor and electrical ground.

According to a further aspect of this embodiment an automatic adjusting circuit is provided for controlling the voltage at the base of said transistor. The automatic adjusting circuit can include a sensor for measuring an amount of ambient light present and increasing the brightness of the LED when the amount of ambient light decreases. The automatic adjusting circuit can also include a voltage divider circuit having two or more resistive elements.

According to a further aspect of this embodiment the range of brightness of the one or more LEDs is related to a voltage drop across the LEDs. Also, according to a further embodiment the voltage at the base of the transistor is controlled by the automatic adjusting circuit to continuously vary between about 1.80 volts when said LED is OFF and not illuminated, and about 3.12 volts when said LED is ON and maximally illuminated.

Also, the brightness of the light generated by the LED according to this embodiment varies within a continuous range from zero millicandelas when the ambient light is greater than a predetermined first threshold to a value greater than 50,000 millicandelas when the ambient light is less than a predetermined second threshold.

According to a further embodiment an electrical wiring device comprises an LED, a housing including a plurality of line terminals and a lens from which light from the LED emanates. A circuit for controlling the brightness of the LED is also provided that includes a transistor having a base, an emitter and a collector, and an automatic adjusting circuit for controlling the voltage at the base of the transistor. The LED is disposed between the emitter of the transistor and electrical ground.

A further aspect of this embodiment includes a light sensor, where the automatic adjusting circuit includes a control circuit configured to regulate the intensity of light emitted by the lens in response to the amount of ambient light detected by the light sensor. The intensity of the light emitted by the lens increases as the intensity of the ambient light decreases, or the intensity of the light emitted by the lens decreases as the intensity of the ambient light increases.

According to yet another embodiment of the invention the electrical device having the LED(s) and the dimming circuit is an electrical GFCI receptacle with a lens disposed on a front surface of the housing.

A method is also provided in accordance with an embodiment of the present invention where the method includes disposing one or more LEDs in an emitter circuit of a transistor, varying a voltage at the base of the transistor over a range of voltages and varying an electrical current flowing in the one or more LEDs in direct relation to varying the voltage at the base of the transistor. According to a further aspect of this embodiment an AC voltage is rectified and provided to a voltage divider circuit for varying the voltage, where the voltage divider circuit includes a photocell device.

BRIEF DESCRIPTION OF THE DRAWINGS

The above and other exemplary features and advantages of certain exemplary embodiments of the present invention will become more apparent from the following description of certain exemplary embodiments thereof when taken in conjunction with the accompanying drawings in which.

DETAILED DESCRIPTION OF EXEMPLARY EMBODIMENTS

The matters exemplified in this description are provided to assist in a comprehensive understanding of exemplary embodiments of the present invention disclosed with reference to the accompanying figures. Those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

Figure 1:
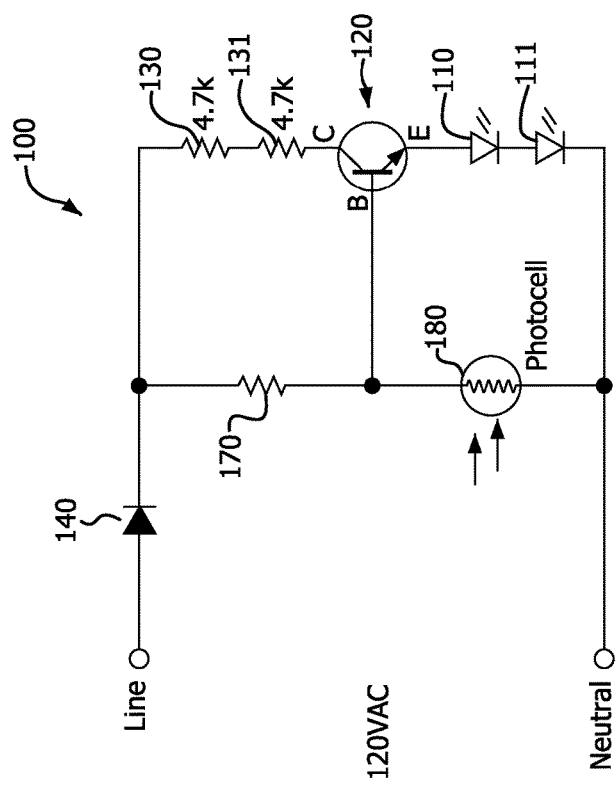
FIG. 1 is an electrical schematic of a circuit for controlling the brightness of an LED in accordance with an embodiment of the present invention.

FIG. 1 is an exemplary circuit in accordance with one embodiment of the present invention. Circuit 100 includes BJT 120 which has respective base (B), collector (C) and emitter (E) terminals. Collector terminal (C) is connected to one end of a series resistor pair (130, 131) each of which, according to this particular embodiment, has a value of 4.7 k-Ohms. The other end of the resistor pair is connected to the positive, or line, side of a power source (not shown) via diode 140. In this embodiment, the power source is an AC source and, thus, diode 140 is provided as a half-wave rectifier to reduce the voltage delivered by the AC source to the collector circuit of BJT 120.

Base terminal (B) of BJT 120 is connected to the middle of a voltage divider circuit made up of resistor 170 and resistor 180. According to this embodiment, resistor 170 has a value of 470 k-Ohms and resistive element 180 is a photocell device having a variable resistance value that changes based on an amount of ambient light sensed by the device. For example, according to this embodiment resistive element 180 is a photocell PDV-P9200 device by Advanced Photonix, Inc. (API) of Camarillo, Calif., which provides a resistance that varies from about 50 k-Ohms, when in the presence of maximum ambient light, or light having a wavelength of approximately 700 nm, to about 5 M-Ohms, when there is no, or virtually no, ambient light sensed by the device, that is, when the wavelength of any ambient light is below 400 nm.

The emitter terminal (E) of BJT 120, according to this embodiment, is connected to two LEDs, 110, 111, connected in series which, in turn, are connected to the neutral rail of the AC power source. For example, LEDs 110 and 111 may be white high-intensity LEDs with part number OVLEW1CB9 by OPTEK Technology Inc. of Carrollton, Tex. The relative brightness of such LEDs increases from zero, or OFF, when there is no forward current flowing through the LEDs, to about 60,000 millicandela (mcd) when the forward current is about 8.5 mA. Accordingly, to take advantage of the full range of brightness of the LED(s), a forward current, i.e., the value of the current in the emitter circuit of BJT 120, is controlled to be from 0 mA, when there is full ambient light present and no output is desired from the LEDs, to about 8.5 mA when there is little or no ambient light present.

According to the embodiment shown in FIG. 1, to achieve a wide range of brightness for the LEDs 110, 111, a variable input voltage is established at the base terminal (B) of BJT 120. For example, the input voltage is varied from a low value of about 1.80 volts, e.g., when the LEDs are OFF, to about 3.12 volts, e.g., when the LEDs are at their maximum brightness. Thus, the full range of brightness is achieved using an input voltage that varies by about 1.32 volts. Of course, a circuit consistent with this embodiment could be designed where the range of the input voltage is controlled to be even greater than 1.32 volts but such a circuit would not necessarily provide additional range in brightness. For example, the input voltage could be controlled to vary from a value less than 1.80 volts to a value greater than 3.12 volts. But no further range in brightness would be achieved according to this specific embodiment because the LED would not turn ON until the input voltage is 1.80 volts and the maximum brightness from the LED is achieved when the input voltage is 3.12 volts.

Figure 3:
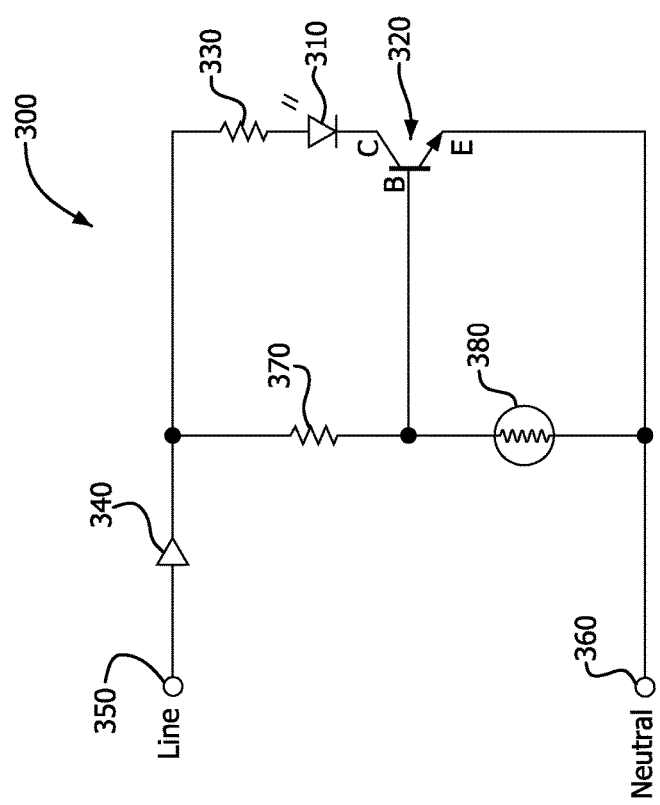
FIG. 3 is an electrical schematic of a conventional circuit for controlling the brightness of an LED.
Figure 4A:
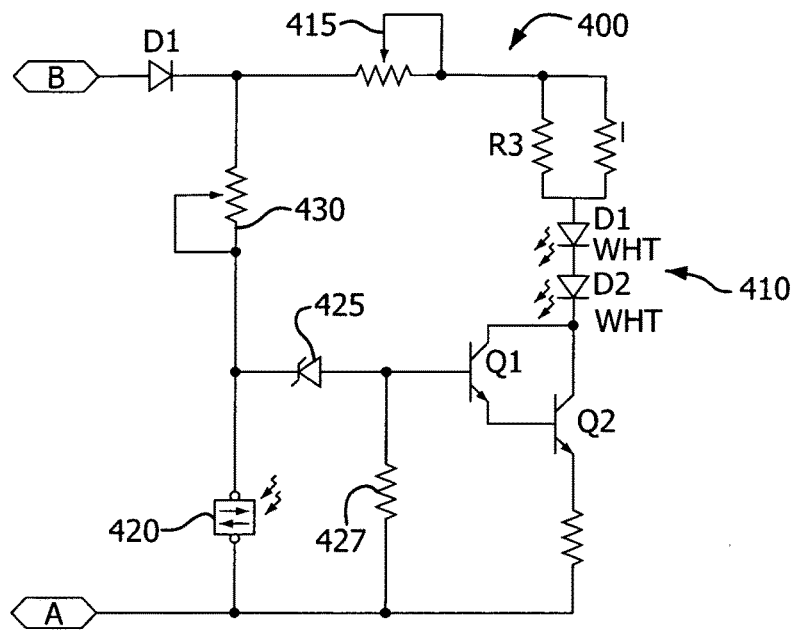
FIG. 4A is an electrical schematic of a further conventional circuit for controlling the brightness of an LED.
Figure 4B:
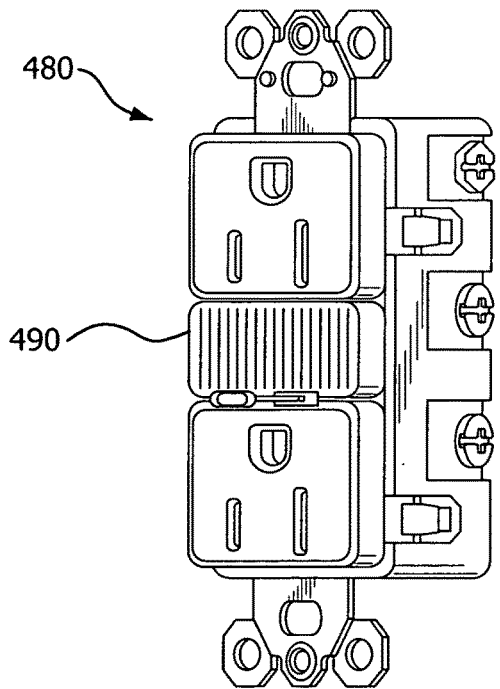
FIG. 4B is a perspective view of a conventional electrical wiring device that includes the circuit shown in FIG. 4A.

In comparison, when the LEDs are placed in the collector circuit, as in the conventional example shown in FIG. 3, the BJT acts like a switch and there is little or no range of forward current through the LEDs. As a result, there is little or no range in brightness illuminated from the LEDs. For example, in accordance with one test conducted on a circuit arranged in accordance with FIG. 3, the LEDs were at full brightness when the input voltage at the base (B) of the BJT was 0.43 volts. The input voltage was then reduced slowly and the LEDs went completely OFF when the input voltage reached about 0.25 volts. Accordingly, the full range of brightness was achieved over an input voltage that only varied by about 0.18 volts. Because the circuit shown in FIG. 3 acts as a switch, that is, either enough current is drawn through the collector circuit to drive the LEDs ON, or enough current is not drawn through collector circuit and the LEDs are OFF, the circuit shown in FIG. 3 does not, and cannot, take advantage of the full range of brightness of the LEDs.

When a wider dimming, or brightness, range is available for illumination devices, certain benefits are realized. For example, instead of the light suddenly turning ON, i.e., at full brightness, after previously being completely OFF, and, thus, potentially causing a distraction, a lamp in accordance with the present invention will gradually become brighter, for example, as ambient light diminishes when current is controlled by a light sensor. Further, according to the present embodiment current flowing in the device is controlled to gradually increase over a period of time, e.g., hours, as opposed to being controlled to switch from zero current to maximum current all at once. This potentially results in an energy savings over time.

Figure 2:
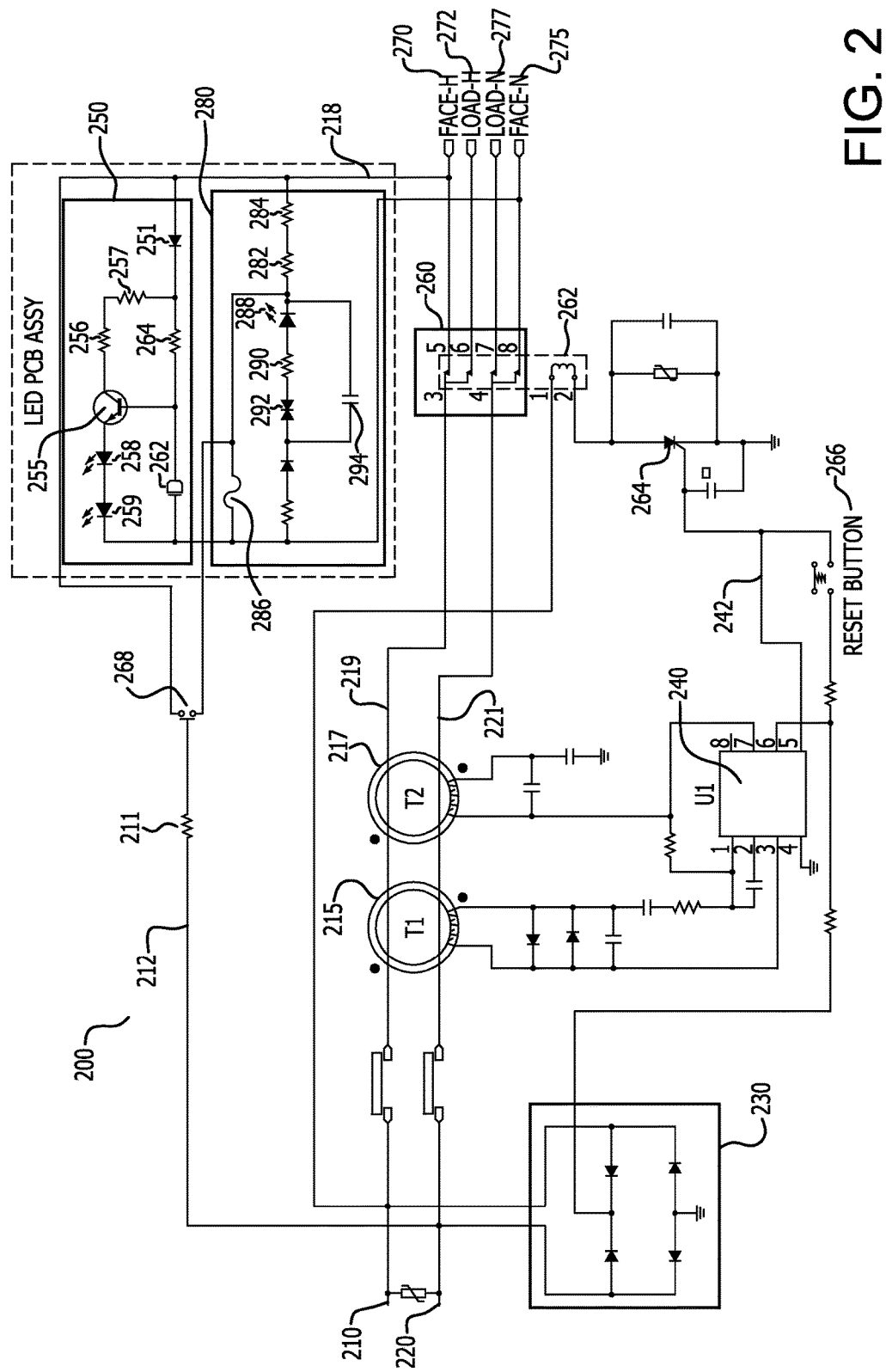
FIG. 2 is an electrical schematic for a circuit used in a wiring device that includes the circuit of FIG. 1 in accordance with an embodiment of the present invention.

FIG. 2 is an electrical schematic in accordance with a further embodiment of the circuit in accordance with the present invention. The schematic of FIG. 2 includes a circuit 200 which is used in a ground fault circuit interrupting device (GFCI) having a nightlight feature. As shown, dimmer circuit 250, which is part of the overall circuit 200, is structurally and functionally, as described in more detail below, similar to circuit 100 described in regard to FIG. 1.

Referring to FIG. 2, hot and neutral terminals 210, 220, respectively, are connected to the hot and neutral rails of an AC power source (not shown). The AC waveform input on terminals 210 and 220 is then full-wave rectified by rectifier circuit 230 which provides power to GFCI chip 240. GFCI chip 240 can be an RV4145 device by Fairchild Semiconductor, Inc. or any other suitable GFCI device. When latch assembly 260 is closed and a load is connected to the GFCI device, current is permitted to flow from the hot input terminal, 210, through the sense and grounded neutral transformers, 215, 217, respectively, on hot line conductor 219 to the hot face and hot load terminals 270, 272, respectively, to deliver power to the connected load(s). In the absence of a ground fault or a grounded neutral fault, the current flowing on hot line conductor 219 returns from the load(s) on neutral conductor 221 via one or both of neutral face terminal 275 and neutral load terminal 277 through grounded neutral transformer 217 and sense transformer 215 back to the neutral rail of the power source. Under certain conditions, a small amount of the current on conductor 219 is also diverted to dimming circuit 250 and end-of life circuit 280 on hot conductor 218. Dimmer circuit 250 and end-of-life circuit 280 are described in more detail below.

As mentioned above, under normal operation, i.e., with no faults present and latch assembly 260 closed, power is delivered to any load(s) connected to the face terminals, 270, 275, and/or the load terminals, 272, 277, via hot and neutral conductors 219, 221. Under these conditions the amount of current flowing on hot conductor 219 from the line terminals to the load and face terminals is equal to the amount of current flowing on neutral conductor 221 from the face and load terminals to the line terminals.

When a fault occurs, e.g., a ground fault and/or a grounded neutral fault, and the amount of current flowing on hot conductor 219 is not equal to the amount of current flowing on neutral conductor 221, a "fault" is detected by GFCI chip 240 and a gate signal is output from GFCI chip 240 on conductor 242. The gate signal is delivered to the gate terminal of SCR 264 to turn the SCR ON, thus, enabling it to conduct current. When the SCR is ON it draws current through solenoid 262 to trip the device. That is, when a fault occurs and current is controlled to flow through solenoid 262, latch assembly 260 is opened to prevent current from flowing in conductors 219, 221, and power is no longer delivered to the load(s). After the fault condition has cleared, reset button 266 can be pressed by the user which mechanically closes latch assembly 260 to once again place the device in condition for normal operation.

Further, it is recommended by the industry that devices such as the one described in accordance with the present embodiment be tested periodically to ensure the device will trip if and when an actual fault occurs. Accordingly, when test button 268 is pressed, some of the current flowing on hot conductor 219 is diverted onto conductor 218 and back to the neutral line terminal 220 via bypass conductor 212 through resistor 211. As a result, the current flowing on hot conductor 219 is not equal to the amount of current flowing on neutral conductor 221 and a fault is, thus, simulated. Under proper operating conditions this simulated fault condition is detected by GFCI chip 240 in similar fashion to a real fault, as described previously, and the device trips, opening latch 260. Similar to the situation when there is a real fault, after a simulated fault condition is generated and the device properly trips, reset button 266 can be pressed by the user which mechanically closes latch assembly 260 to once again place the device in condition for normal operation.

The configuration and operation of dimming circuit 250 is now described in accordance with the present embodiment. Similar to the circuit described in regard to FIG. 1, dimming circuit 250 of GFCI circuit 200 includes an input diode 251 for half-wave rectifying the AC waveform resident on conductor 219. The collector of BJT 255 is connected to two resistors, 256, 257, which are arranged in-series between the transistor collector and the rectified power signal. The emitter of BJT 255 is connected to one end of two series-connected LEDs, 258, 259, and the other end of the series LED combination is connected to one end of a photocell device 262. The opposite end of the photocell device 262 is connected to the base of BJT 255 and also to one end of resistor 264. The opposite end of resistor 264 is connected to the rectified power signal.

When a sufficient amount of ambient light is available in the vicinity of GFCI device, photocell device 262 has a very low resistance value. Accordingly, a small amount of current is permitted to flow from hot conductor 219 to neutral conductor 221 through a branch circuit which includes conductor 218, diode 251, resistor 264 and photocell 262. Under this condition no current, or very little current, flows into the base of transistor 255 and, thus, no voltage is present on the base of transistor 255, and LEDs 258, 259 remain OFF, or non-illuminated.

As the amount of ambient light diminishes, for example as nightfall approaches or the lighting in the room where the GFCI device is installed is dimmed or completely extinguished, the resistance value of photocell 262 begins to increase. As a result, an increasing amount of current is permitted to flow into the base of transistor 255, as a diminishing amount of current flows through photocell 262, and an increasing voltage is created on the base of the transistor.

End-of-life circuit 280 operates as follows. When test button 268 is pressed, a simulated ground fault is generated, as described previously, and if the device is operating properly, the device trips. If, however, the device does not trip when the test button is pressed, for example, because the GFCI chip 240 failed to detect the fault condition or the latch assembly contacts were stuck in the closed, or reset, state, and end-of-life condition (EOL) is indicated. Specifically, if the device does not trip when contacts 1 and 2 of test button 268 engage, contacts 1, 2 and 3 of test button 268 engage and current is permitted to flow from the hot conductor 219 through the branch circuit including conductor 218, test button 268 and fuse 286 before returning to neutral conductor 221. As a result of this continued current flow, fuse 286 opens and current is permitted to flow from the hot conductor 219 through the branch circuit including conductor 218, resistors 284, 282, capacitor 294, diode pair 292, resistor 290 and LED 288. As capacitor 294 charges and discharges current is drawn through the branch circuit and the LED 288 blinks, indicating the end-of-life condition.

While the present invention has been shown and described with reference to particular illustrative embodiments, it is not to be restricted by the exemplary embodiments but only by the appended claims and their equivalent. It is to be appreciated that those skilled in the art can change or modify the exemplary embodiments without departing from and the scope and spirit of the present invention.

What is claimed is:

1. A circuit for controlling a brightness of a light emitting diode (LED), the circuit comprising:
   a transistor having a base, an emitter, and a collector, wherein said emitter is configured to emit a forward current;
   a voltage source configured to generate a voltage at said base of said transistor, wherein said voltage at said base of said transistor is configured to control said forward current emitted by said emitter; and
   said LED disposed between said emitter of said transistor and an electrical ground and configured to generate light and receive said forward current from said emitter, wherein said brightness of said LED depends on said voltage generated at said base of said transistor and said forward current received from said emitter; and
   an automatic adjusting circuit including a sensor configured to measure an amount of ambient light,
   wherein said brightness of said light generated by said LED varies within a continuous range from zero millicandelas when said amount of ambient light is greater than a predetermined first threshold to greater than fifty thousand millicandelas when said amount of ambient light is less than a predetermined second threshold,
   wherein said automatic adjusting circuit is configured to control said voltage at said base of said transistor to be at least 1.80 volts when said amount of ambient light is greater than said predetermined first threshold, and control said voltage at said base of said transistor to be up to 2.3 volts when said amount of ambient light is less than said predetermined second threshold.

2. The circuit of claim 1, wherein said automatic adjusting circuit further includes a voltage divider circuit.

3. The circuit of claim 1, further comprising a plurality of LEDs including said LED, said plurality of LEDs disposed between said emitter of said transistor and said electrical ground.

4. The circuit of claim 1, wherein a range of brightness of said LED is related to a voltage drop across said LED.

5. The circuit of claim 1, wherein said voltage at said base of said transistor is controlled by said automatic adjusting circuit to continuously vary between about said 1.80 volts when said LED is OFF with said zero millicandelas and about 3.12 volts when said LED is ON with greater than said fifty thousand millicandelas.

6. The circuit of claim 1, wherein said automatic adjusting circuit is further configured to control said voltage at said base of said transistor to be up to 2.8 volts when said amount of ambient light is less than said predetermined second threshold.

7. The circuit of claim 6, wherein said automatic adjusting circuit is further configured to control said voltage at said base of said transistor to be up to 3.12 volts when said amount of ambient light is less than said predetermined second threshold.

8. An electrical wiring device comprising:
a light emitting diode (LED);
a housing including a plurality of line terminals and a lens from which light from said LED emanates; and
a circuit for controlling a brightness of said LED, said circuit including
a transistor having a base, an emitter, and a collector, wherein said emitter is configured to emit a forward current, and
an automatic adjusting circuit configured to control a voltage at said base of said transistor, wherein said voltage at said base of said transistor is configured to control said forward current emitted by said emitter, said automatic adjusting circuit including a sensor configured to measure an amount of ambient light that is external to said housing,
wherein said LED is disposed between said emitter of said transistor and an electrical ground and configured to receive said forward current from said emitter of said transistor, and wherein said brightness of said LED depends on said voltage at said base of said transistor and said forward current received from said emitter,
wherein said brightness of said light generated by said LED varies within a continuous range from zero millicandelas when said amount of ambient light is greater than a predetermined first threshold to greater than fifty thousand millicandelas when said amount of ambient light is less than a predetermined second threshold,
wherein said automatic adjusting circuit is configured to control said voltage at said base of said transistor to be at least 1.80 volts when said amount of ambient light is greater than said predetermined first threshold, and control said voltage at said base of said transistor to be up to 2.3 volts when said amount of ambient light is less than said predetermined second threshold.

9. The electrical wiring device of claim 8, wherein said automatic adjusting circuit includes a control circuit configured to regulate an intensity of light emitted by said lens in response to said amount of ambient light detected by said sensor.

10. The electrical wiring device of claim 9, wherein said intensity of said light emitted by said lens increases as said amount of ambient light decreases, or said intensity of said light emitted by said lens decreases as said amount of ambient light increases.

11. The electrical wiring device of claim 8, wherein said automatic adjusting circuit is further configured to control said voltage at said base of said transistor to be up to 2.8 volts when said amount of ambient light is less than said predetermined second threshold.

12. The electrical wiring device of claim 8, wherein said automatic adjusting circuit includes a photocell device.

13. The electrical wiring device of claim 8, further comprising a rectifying circuit, wherein said rectifying circuit is configured to rectify an AC voltage and provide a rectified AC voltage from a rectification of said AC voltage to said automatic adjusting circuit.

14. The electrical wiring device of claim 8, wherein said electrical wiring device is an electrical receptacle with said lens disposed on a front surface of said housing.

15. The electrical wiring device of claim 14, wherein said electrical receptacle is a GFCI receptacle.

16. A method of controlling a brightness of one or more light emitting diodes (LEDs), the method comprising:
disposing one or more LEDs in an emitter circuit of a transistor between said emitter circuit and an electrical ground;
receiving, with said one or more LEDs, a forward current, wherein said brightness of said one or more LEDs depends on a voltage at a base of said transistor and current level of said forward current emitted by said emitter circuit of said transistor;
measuring an amount of ambient light;
controlling said voltage at said base of said transistor to be at least 1.80 volts when said amount of ambient light is greater than a predetermined first threshold; and
controlling said voltage at said base of said transistor to be up to 3.12 volts when said amount of ambient light is less than a predetermined second threshold.

17. The method of claim 16, further comprising:
rectifying an AC voltage; and
providing a rectified AC voltage from said rectification of said AC voltage to a voltage divider circuit for controlling of said voltage at said based of said transistor, wherein said voltage divider circuit includes a photocell device.

* * * * *